Feb. 24, 1931. W. DUDLEY 1,794,108
WINDSCREEN WIPER
Filed July 11, 1927  2 Sheets-Sheet 1
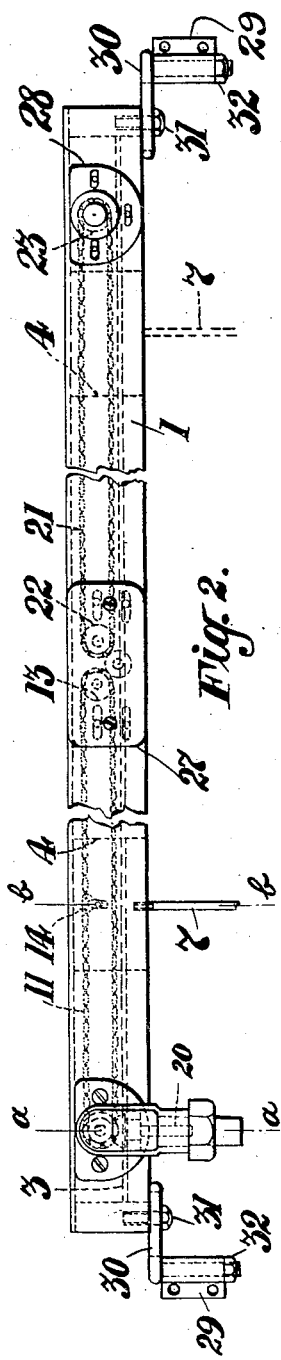
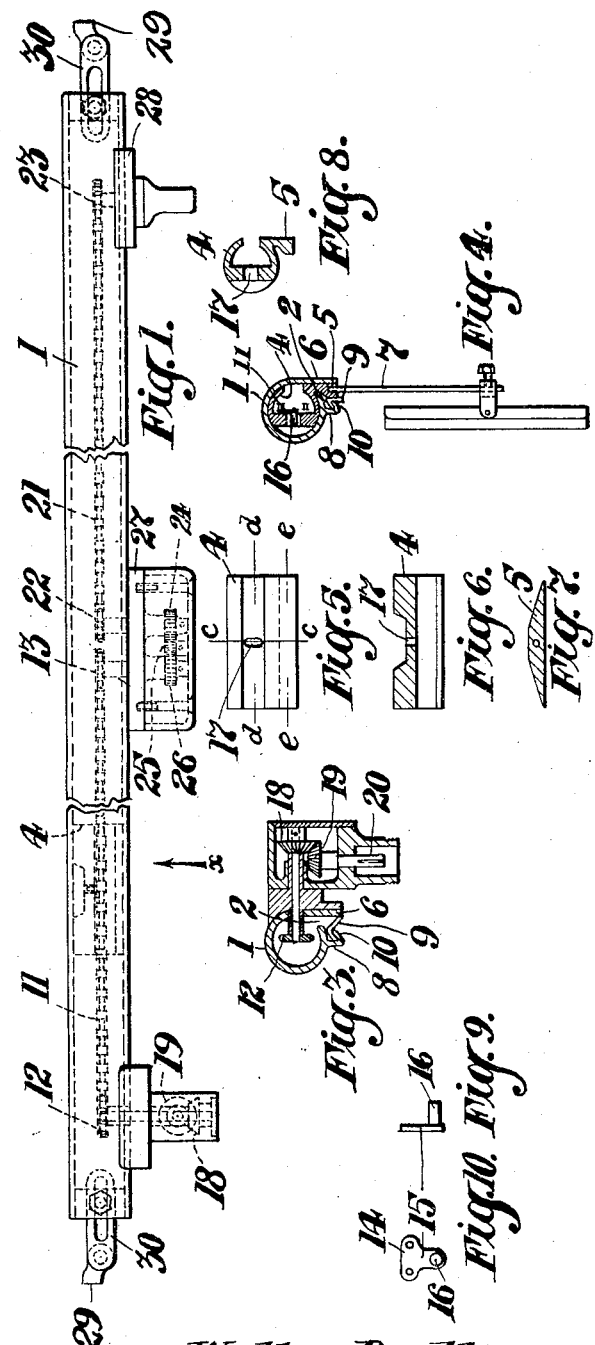
Walter Dudley
Inventor
By C.A.Snow & Co.
Attorneys.

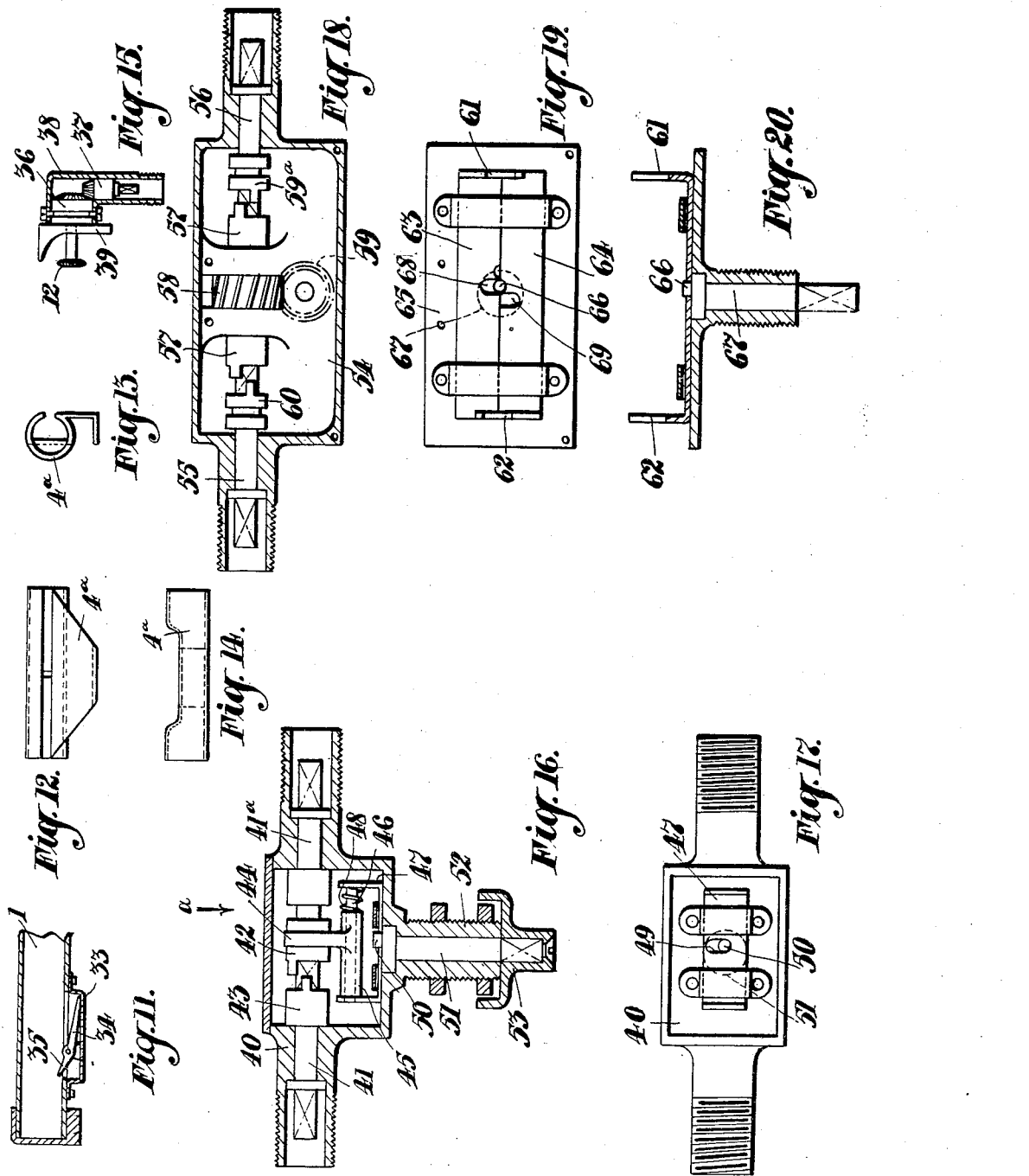

Patented Feb. 24, 1931

1,794,108

UNITED STATES PATENT OFFICE

WALTER DUDLEY, OF RAWTENSTALL, ENGLAND

WIND-SCREEN WIPER

Application filed July 11, 1927, Serial No. 204,983, and in Great Britain July 14, 1926.

This invention relates to wind screen wipers or apparatus for cleaning the wind screens of motor propelled vehicles, of the type in which the wiper arm is automatically driven backwards and forwards across the wind screen by means of an endless chain or band housed in a horizontal guide or frame member fixed to the wind screen, the endless band or chain being connected to a slide mounted in the guide or frame member.

According to the present improvements, an endless chain or chains is or are mounted in a hollow guide or frame member of improved construction whilst the slide to which is attached the wiper arm is also of improved construction. The guide or frame member is also mounted so that the cleaning mechanism can be applied to any type of vehicle.

Referring to the drawings:—

Figure 1 is a plan view of the cleaning apparatus constructed according to this invention.

Figure 2 is a side elevation looking in the direction of arrow $x$ Figure 1.

Figure 3 is a section on line $a\ a$ of Figure 2.

Figure 4 is a section on line $b\ b$ of Figure 2.

Figure 5 is a side elevation of the slide detached.

Figure 6 is a section on line $d\ d$ of Figure 5.

Figure 7 is a section on line $e\ e$ of Figure 5.

Figure 8 is a section on line $c\ c$ of Figure 5.

Figure 9 is a side elevation of a link of the chain having a pin fixed thereon for engaging the slide.

Figure 10 is a front elevation of Figure 9.

Figure 11 is a longitudinal sectional view illustrating a modified form of this invention.

Figures 12, 13, and 14 are respectively front, edge, and plan views of a modified form of slide.

Figure 15 illustrates a modified construction of the gearing shown by Figure 3.

Figure 16 is a cross sectional view of a clutch box hereinafter described.

Figure 17 is a view looking inside the box in the direction of arrow $a$, Figure 16, with a part of the interior removed.

Figure 18 is a cross sectional view of a modified form of clutch box.

Figure 19 is an inner face view of a clutch box side plate removed, and

Figure 20 is a central longitudinal section of the part shown by Figure 19.

The apparatus for cleaning wind screens comprises a guide bar or frame member 1 which is tubular or hollow. A longitudinal slot 2 is provided in the underside of this member 1, such slot being located to one side of the centre so that a trough or ledge 3 is formed centrally on the underside of this guide or frame member. A slide 4 is mounted in this guide tube, such slide being of a corresponding cross sectional shape to that of the guide tube 1. This slide has a depending projection 5 which passes through the slot 2 so that the slide 4 is constrained to have a longitudinal movement only in the guide tube 1. The depending projection 5 bears against the depending flange 6 passing down from one side of the slot 2 and the wiper arm 7 is fixed to this depending portion in any convenient manner. A depending flange 8 passes from the underside of the guide tube 1 and a strip of rubber or other flexible material 9 is fixed to this depending flange 8. Conveniently this depending flange 8 has an inturned portion 10 which, after the edge of the rubber has been fitted in the groove formed by this inturned portion 10, is pressed inwardly to grip the rubber strip. This rubber strip passes across the opening and bears against the flange 6 aforementioned. The depending flange 5, as shown by Figure 7 is wedge-shaped at each end so that it will press the rubber strip back as such flange 5 moves backwards and forwards between the flanges 8 and 6.

In the form illustrated two slides 4 are mounted in the tube 1 so that each slide traverses half the length of the screen. A chain 11 passes over the driving sprocket wheel 12 and the sprocket wheel 13 and one link 14 of this chain has a projection 15 fixed or formed thereon which carries a pin 16. The length of the projection 15 is such that the centre of the pin 16 is arranged co-axially with the sprocket wheels 12 and 13 when the link 14 passes around such sprocket wheels. The pin 16 is engaged in the slot 17 in the slide 4 so that as the chain is driven the slide 4 is moved backwards and forwards between the sprocket wheels 12 and 13. As the projection 15 is fixed in relation to the link 14 liability of binding is prevented, whilst the slot 17 also allows a slight movement of the pin 16 therein. The chain 11 passes through the hollow slide 4 so that the force moving the slide is substantially central thereof, thereby reducing friction and enabling an easy and free movement to be obtained. The chain 11 is also located over the trough 3, and should the chain sag it will bear on this trough. This trough will also receive any oil dropping from the chain and will enable the parts to be properly lubricated without liability of the oil passing through the slot 2. The sprocket wheel 12 is mounted on a spindle having a bevel wheel 18 fixed thereon, this bevel wheel engaging a bevel wheel 19 fixed to a spindle 20 to the end of which a flexible driving element is fixed. The second chain 21 is mounted on the sprocket wheels 22 and 23, the sprocket wheel 22 being mounted on a spindle carrying the toothed wheel 24. This toothed wheel 24 is driven by means of the toothed wheels 25 and 26, the latter being keyed on the spindle carrying the sprocket wheel 13. The spindles carrying the sprocket wheels 13 and 22 are mounted on a member 27 which is adjustable on the tube 1 to take up any slackness of the chain 11. The spindle carrying the sprocket wheel 23 is mounted on a member 28 also adjustable on the guide tube 1 to take up any slackness in the chain 21. The slide 4 is driven by the chain 21 similarly as with the chain 11. The guide tube is mounted on the wind screen by means of brackets 29 which are fixed to the side standards of the screen. The slotted arms 30 are pivotally mounted in these brackets, and the ends of the guide tube 1 are adjustably fixed to the arms 30 by means of a pin 31. The guide tube 1 can thus be adjustably fixed by means of the pivotal movement of the arms 30 in a forward or backward direction, whilst the apparatus may also be fitted to screens of varying widths. The slotted arm 30 is located in the adjusted position by means of the nut 32.

According to the modification shown by Figure 11 an oil sump 33 is provided near each end of the longitudinal tube 1. The pivoted lever 34 is mounted in this sump so that one end 35 projects into the path of the slide 4, whereby when the slide nears each end of its stroke the lever 34 throws up oil on to the slide.

In lieu of the slide being formed as a casting, the slide 4ª as shown by Figures 12, 13, and 14, may be constructed as a sheet metal pressing.

As shown by Figure 15, the bevel gearing for driving the sprocket 12 may be formed on cylindrical blocks 36 and 37 which are rotatably mounted in a casing 38 fixed by means of the member 39 to the longitudinal tube 1.

The wiper above described is conveniently driven from the transmission mechanism of the car or other member rotated by the engine power through the medium of a flexible shaft drive. In order to control the stopping and starting of the wiper a clutch box is provided. As shown by Figures 16 and 17, the clutch box comprises a casing 40 in which is mounted the spindle 41 to which is connected the flexible shaft driven by the transmission mechanism. On the opposite side of the casing a spindle 41ª is mounted and is connected by a flexible shaft to the spindle 20. A dog 42 is mounted on the squared end of the spindle 41ª and is adapted to engage with a dog 43 on the spindle 41. The clutch fork 44 is carried by the member 45 which is slidably mounted on the pin 46 carried by the slide 47, the spiral spring 48 normally forcing the member 45 in the engaging direction. The slide 47 is mounted on the bottom of the recess in the casing 40, and a slot 49 therein is engaged by the eccentrically mounted pin 50 carried by the spindle 51. This clutch box casing is conveniently fixed to the dash-board by means of a stem 52 of the casing 40 passing through a hole in the dash-board and retained in position by suitable lock nuts. By giving the thumb piece 53 half a turn, the slide 47 is moved to engage the dog 42 with the dog 43 to operate the wiper. A spring 48 allows the slide 47 to move in any position of the teeth of the dogs 42 and 43, and if the teeth are opposite one another subsequent engagement is assured on the rotation of the dog 43.

In some cases wind screens are V-shaped, in which case two wiper arms are provided which are independently controlled and according to the clutch box shown by Figures 18, 19 and 20, a single control is provided for both wipers. In this construction the box 54 carries the spindles 55 and 56 which are respectively connected to the flexible shafts transmitting the drive to the wiper driving mechanism. A central spindle 57 is mounted in the casing 54 and is driven by means of the worm wheel 58 and the worm 59, which latter is driven by the flexible shaft connected to the transmission mechanism of the car. Dogs 59ª and 60 are respectively mounted on the spindles 56 and 55 and such dogs have annular grooves which are engaged by the arms 61 and 62 of the slides 63 and 64. These two latter slides are mounted upon a face plate 65 which is fixed to the face of the box 54. An eccentric pin 66 carried by the control spindle 67 is adapted to engage the slots 68 and 69 respectively in the slides 63 and 64. One half rotation of the control spindle 67 operates one slide to engage one dog with the spindle 57 and the continued half rotation engages the other dog with the other side of the spindle 57. Therefore either wiper or both wipers may be controlled by the control pin 67. The arms 61 and 62 are conveniently flexible to serve the purpose of the spring 48 previously described.

I claim:

A windscreen wiper comprising a hollow cylindrical guide bar having a slot in the lower side located to one side of the centre to form an oil trough at the bottom of the guide bar, a projecting flange, formed by an extension of the wall of the tube at the side of the slot, a cylindrical hollow slide having a cylindrical bearing surface on the exterior adapted to slidably engage the interior cylindrical surface of the guide bar and having a flange projecting through the slot adapted to press against the flange on the guide tube to resist the pressure of the wiper on the wind screen, a sealing strip adapted to press against the guide tube flange and between which strip and the flange on the guide tube, the flange on the slide is located, a wiper arm fixed to the slide flange, and a flexible member driving the slide without forming a support for the slide.

In witness whereof I have signed this specification.

WALTER DUDLEY.